United States Patent
Finkelstein et al.

(10) Patent No.: US 7,764,750 B2
(45) Date of Patent: Jul. 27, 2010

(54) PHASE CORRELATOR FOR WIRELESS RECEIVER AND METHOD FOR CORRELATING USING PHASE-QUANTIZED SIGNALS

(75) Inventors: Yuval Finkelstein, Yokneam Elite (IL); Simha Sorin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1074 days.

(21) Appl. No.: 11/378,162

(22) Filed: Mar. 17, 2006

(65) Prior Publication Data
US 2007/0237245 A1 Oct. 11, 2007

(51) Int. Cl.
*H04L 27/06* (2006.01)
*H04L 7/00* (2006.01)
(52) U.S. Cl. .................. 375/343; 375/340; 375/355
(58) Field of Classification Search ................. 375/142, 375/150, 209, 260, 261, 267, 343, 349, 316, 375/340, 355; 370/57, 69.1, 281, 295, 478; 455/139, 276.1, 304
See application file for complete search history.

(56) References Cited

U.S. PATENT DOCUMENTS

| | | | | |
|---|---|---|---|---|
| 5,016,261 A | * | 5/1991 | Amoroso et al. | 375/317 |
| 6,493,405 B1 | * | 12/2002 | Olaker et al. | 375/343 |
| 6,697,444 B1 | * | 2/2004 | Iizuka et al. | 375/343 |
| 7,333,555 B2 | | 2/2008 | Basson, et al. | |
| 7,352,833 B2 | * | 4/2008 | Gossett et al. | 375/350 |
| 2004/0005022 A1 | * | 1/2004 | Zhu et al. | 375/365 |
| 2004/0223572 A1 | * | 11/2004 | Brown et al. | 375/375 |
| 2005/0047520 A1 | * | 3/2005 | Yang et al. | 375/296 |
| 2005/0058095 A1 | * | 3/2005 | Sadri et al. | 370/329 |
| 2006/0126491 A1 | * | 6/2006 | Ro et al. | 370/208 |
| 2007/0049229 A1 | | 1/2007 | Finkelstein et al. | |

* cited by examiner

*Primary Examiner*—Tesfaldet Bocure
*Assistant Examiner*—Lawrence B Williams
(74) *Attorney, Agent, or Firm*—Schwegman, Lundberg & Woessner, P.A.; Gregory J. Gorrie

(57) ABSTRACT

Embodiments of a correlator, a receiver, and a method for performing correlations are generally described herein. Other embodiments may be described and claimed. In some embodiments, input samples are phase-quantized into phase-quantized samples of substantially equal magnitude with approximately the original phase. The phase-quantized samples of substantially equal magnitude with approximately the original phase are correlated with a reference signal.

29 Claims, 3 Drawing Sheets

PHASE CORRELATOR FOR WIRELESS RECEIVER AND METHOD FOR CORRELATING USING PHASE-QUANTIZED SIGNALS

TECHNICAL FIELD

Some embodiments of the present invention pertain to wireless communication systems. Some embodiments pertain to wireless networks.

BACKGROUND

Receivers generally include circuitry to perform auto-correlations and/or cross-correlations to determine whether an input signal has a desired property. For example, in wireless networks, such as wireless local area networks (WLANs) and broadband wireless access (BWA) networks, correlations are performed to identify special training signals. In code-division multiple access (CDMA) systems, correlations are performed in the rake receiver to identify and combine spread spectrum signal components. In radar and target-detection systems, correlations may be performed to identify radar-return signals.

In some situations, only the structure of the received signal is of interest, not its magnitude; therefore some conventional correlators generally perform an energy normalization process to eliminate the magnitude information for subsequent circuitry. This energy normalization process requires excess hardware and consumes power.

Thus, there are general needs for receivers that perform correlations without the need for energy normalization. There are also general needs for receivers that perform correlations that require less hardware and/or consume less energy.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
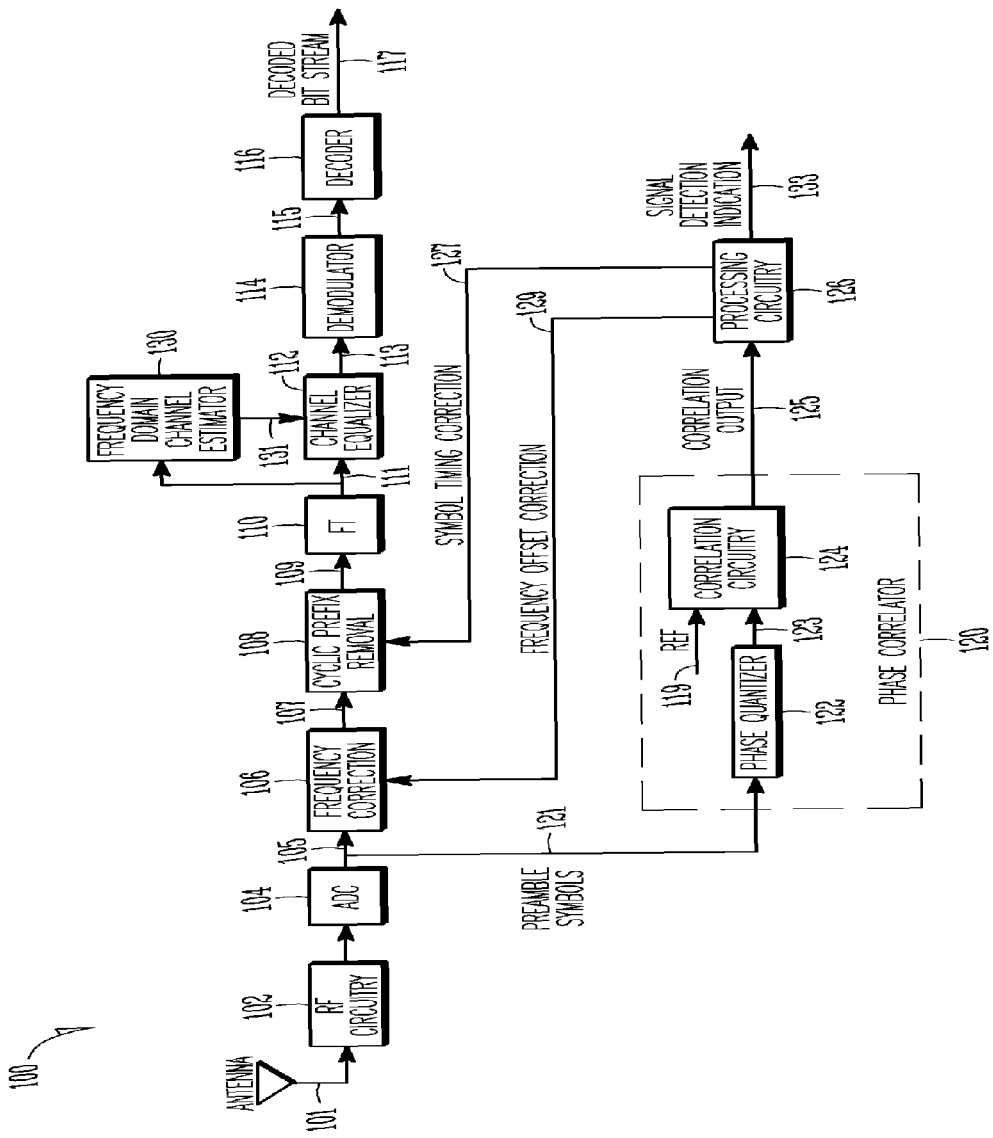
FIG. 1 is a block diagram of a receiver in accordance with some embodiments of the present invention.

FIG. 1 is a block diagram of a receiver in accordance with some embodiments of the present invention. Receiver 100 receives radio-frequency (RF) signals through antenna 101, processes the received signals, and generates decoded bit stream 117. Receiver 100 is illustrated in FIG. 1 as a multi-carrier receiver which may receive and process multicarrier signals, such as orthogonal frequency division multiplexed (OFDM) signals and orthogonal frequency division multiple access (OFDMA) signals, however the scope of the invention is not limited in this respect. Other embodiments of the present invention are applicable to other types of communication signals, such as spread spectrum signals including CDMA and complementary code keying (CCK) signals.

Receiver 100 may include radio-frequency (RF) circuitry 102 to down-convert the received signals and analog-to-digital conversion (ADC) circuitry 104 to digitize the received signals and generate digital time-domain signals 105. Receiver 100 may also include frequency correction circuitry 106 to correct any frequency offset present in the received signals by applying a frequency correction indicated by frequency-offset correction signal 129. In some embodiments, receiver 100 may also include cyclic prefix removal circuitry 108 to remove a cyclic prefix from frequency-corrected time-domain signals 107 based on symbol-timing information indicated by symbol-timing correction signal 127. In some embodiments, receiver 100 may also include processing circuitry 126 to generate symbol-timing correction signal 127 and frequency-offset correction signal 129, as described in more detail below.

Receiver 100 may also include Fourier-transform (FT) circuitry 110 to perform a Fourier transform on digital time-domain signals 109 to generate frequency-domain signals 111. In some embodiments, Fourier-transform circuitry 110 may provide a frequency-domain signal for each subcarrier of a received multicarrier communication signal. In some embodiments, Fourier-transform circuitry 110 may perform a discrete Fourier transform (DFT), such as a fast Fourier transform (FFT), although the scope of the invention is not limited in this respect.

Receiver 100 may also include frequency-domain channel estimator 130 to generate channel estimates 131 for each data subcarrier based on frequency-domain signals 111. In some embodiments, channel estimates 131 may comprise weights for each data subcarrier. Receiver 100 may also include channel equalizer 112 to weight the subcarriers of frequency-domain signals 111 based on channel estimates 131 to generate channel-equalized frequency-domain signals 113. In accordance with some embodiments, the application of the weights by channel equalizer 112 may help compensate for the effects of the communication channel through which the received signals may have propagated. In some embodiments, channel equalizer 112 may substantially cancel the effects of the communication channel. In some embodiments, channel-equalized frequency-domain signals 113 may comprise a symbol, such as a quadrature-amplitude modulated (QAM) symbol, for each data subcarrier, although the scope of the invention is not limited in this respect.

Receiver 100 may also include demodulator 114 to demodulate frequency-domain signals 113 and generate bit-metrics 115 for each data subcarrier. In some embodiments, symbol demodulator 114 may be a quadrature-amplitude modulation demodulator and the symbols may comprise QAM symbols. Receiver 100 may also include decoder 116 to perform an error-correction decoding operation on bit metrics 115 to generate decoded bit stream 117. In these embodiments, bit metrics 115 may represent probabilities (e.g., soft bits rather than actual hard bits), which may be decoded using a soft-decision decoder. In these embodiments, decoder 116 may be a soft-decision decoder, such as a Viterbi decoder, although the scope of the invention is not limited in this respect.

In some embodiments, receiver 100 may also perform a deinterleaving operation prior to the operation of decoder 116. In some of these embodiments, the deinterleaving operation may be a block deinterleaving operation on blocks of hard bits or on blocks of bit metrics 115, although the scope of the invention is not limited in this respect.

Receiver 100 may also include phase correlator 120 to perform a correlation on input samples 121 and generate correlation output 125. Correlation output 125 may be processed by processing circuitry 126 to generate symbol-timing correction signal 127, frequency-offset correction signal 129, and/or signal-detection indication signal 133. In accordance with some embodiments, phase correlator 120 may include phase quantizer 122 to phase-quantize input samples 121 into phase-quantized samples 123 having substantially equal magnitude. Phase correlator 120 may also include correlation circuitry 124 to correlate phase-quantized samples 123 with reference signal 119. In these embodiments, phase quantizer 122 may substantially remove and/or discard the magnitude information from input samples 121. Phase correlator 120 may perform a correlation using primarily the phase components of input samples 121 by using phase-quantized samples 123.

In these embodiments, phase-quantized samples 123 do not have substantially different magnitude components. In other words, the magnitude components of phase-quantized samples 123 may be about the same. The magnitude information of input samples 121 may be discarded and phase information may be used by correlation circuitry 124. This loss of information (i.e., the magnitude information) may result in a significant reduction in the amount of hardware required to perform correlations. For example, unlike some conventional correlators, an energy normalization may not be required as part of the correlation. In some embodiments, processing circuitry 126 may not need to perform an energy normalization required by some conventional receivers. These embodiments not only require less hardware, but may consume less energy, which may be particularly important in some portable and hand-held embodiments. In some embodiments, due to the phase quantization performed by phase quantizer 122, phase-quantized samples 123 may be represented by a small number of bits, allowing correlation circuitry 124 to perform correlations with less hardware than conventional correlators. Furthermore, although the quantization performed by phase quantizer 122 may comprise only a phase quantization, additional hardware savings may be achieved.

Figure 2A:
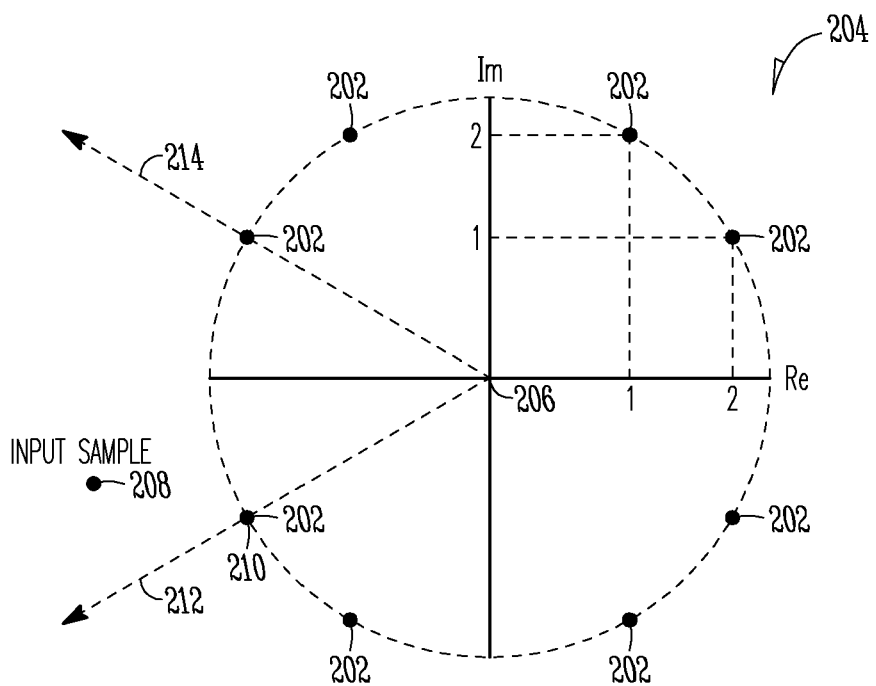
FIG. 2A graphically illustrates an example of phase quantization performed for some higher-resolution embodiments of the present invention.

In some embodiments, the phase components of phase-quantized samples 123 may have one of a plurality of predetermined values. In some embodiments, the magnitude components of phase-quantized samples 123 may be the same and may have a value selected from a group of a few predetermined or fixed values. In some embodiments, the magnitude component may be within a small set of predetermined values. In some higher-resolution embodiments, the output of phase quantizer 122 may comprise one of the following eight predetermined outputs: 1+2j, 1−2j, −1+2j, −1−2j, 2+j, 2−j, −2+j, or −2−j, described in real and imaginary parts. This is illustrated in FIG. 2A described in more detail below. In these higher-resolution embodiments, the magnitude component of the output of phase quantizer 122 may be about equal to the square-root of the sum of the real part squared and the imaginary part squared. In these higher-resolution embodiments, the magnitude component may be about equal to the square-root of either $1^2+2^2$ or $2^2+1^2$, which equals the square-root of five, although the scope of the invention is not limited in this respect.

Figure 2B:
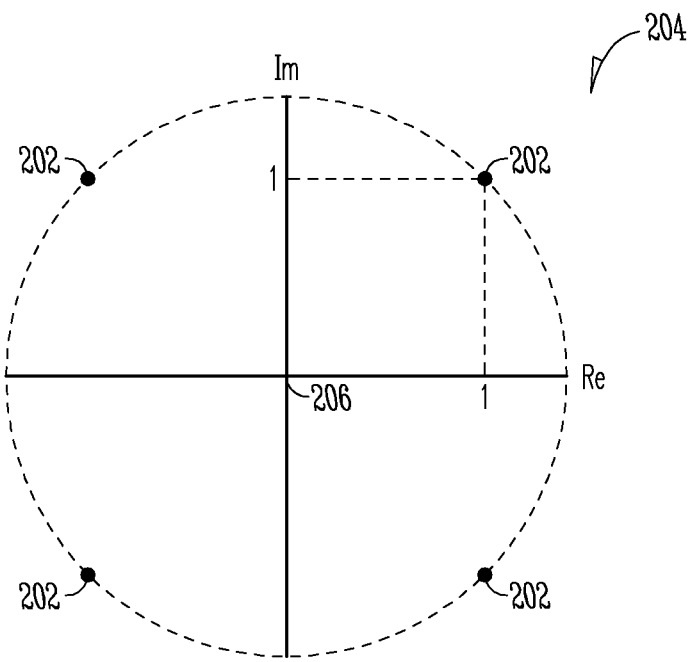
FIG. 2B graphically illustrates an example of phase quantization performed for some lower-resolution embodiments of the present invention.

In some lower-resolution embodiments, the output of phase quantizer 122 may comprise one of the following four predetermined outputs: 1+j, 1−j, −1+j, or −1−j, described in real and imaginary parts. In these lower-resolution embodiments, the squared magnitude component of the output of phase quantizer 122 may also be about equal to the sum of the real part squared and the imaginary part squared. This is illustrated in FIG. 2B described in more detail below. In these lower-resolution embodiments, the magnitude component may be about equal to the square-root of $1^2+1^2$, which equals the square-root of two, although the scope of the invention is not limited in this respect. Other embodiments, including even higher-resolution embodiments, may produce sixteen or more predetermined outputs for the phase components.

In some embodiments, input samples 121 may comprise one or more preamble symbols, which may be at the beginning of a frame, such as an OFDM frame or an OFDMA frame. The preamble symbols may comprise one or more training signals (e.g., predetermined training sequences) that are transmitted on predetermined subcarriers. In these embodiments, reference signal 119 may comprise the training signals when correlation circuitry 124 is performing a cross-correlation to identify the preamble symbols. Alternatively, reference signal 119 may comprise a delayed version of the received signal (e.g., phase-quantized samples 123) when correlation circuitry is performing an auto-correlation, although the scope of the invention is not limited in this respect. Auto-correlations and/or cross-correlations may be performed by correlation circuitry 124 in both multicarrier (e.g., OFDM/OFDMA) embodiments and spread-spectrum (e.g., CDMA/CCK) embodiments.

In some spread-spectrum embodiments, receiver 100 does not need to include cyclic-prefix removal circuitry 108, Fourier-transform circuitry 110, frequency-domain channel estimator 130 and channel equalizer 112. In these spread-spectrum embodiments, processing circuitry 126 may generate one or more signals, such as signal-detection indication signal 133, for identifying received training signals.

Although receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of receiver 100 (FIG. 1) may refer to one or more processes operating on one or more processing elements.

In some embodiments, receiver 100 may be part of a wireless communication device that may communicate OFDM communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, receiver 100 may communicate in accordance with a multiple access technique, such as OFDMA, although the scope of the invention is not limited in this respect. In some embodiments, receiver 100 may be part of a wireless communication device that may communicate using spread-spectrum signals, although the scope of the invention is not limited in this respect.

In some embodiments, receiver 100 may be part of a communication station, such as a WLAN communication station including a Wireless Fidelity (WiFi) communication station, an access point (AP), or mobile station (MS). In some other embodiments, receiver 100 may be part of a BWA network communication station, such as a Worldwide Interoperability for Microwave Access (WiMax) communication station, although the scope of the invention is not limited in this respect as receiver 100 may be part of almost any wireless communication device. In some embodiments, receiver 100 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals received by receiver 100 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, receiver 100 may receive signals in accordance with specific communication standards, such as the Institute of Electrical and Electronics Engineers (IEEE) standards including IEEE 802.11(a), 802.11(b), 802.11(g), 802.11(h), and/or 802.11(n) standards and/or proposed specifications for wireless local area networks, although the scope of the invention is not limited in this respect as they may also be suitable to transmit and/or receive communications in accordance with other techniques and standards. In some broadband wireless access network embodiments, receiver 100 may receive signals in accordance with the IEEE 802.16-2004 and the IEEE 802.16(e) standards for wireless metropolitan area networks (WMANs), including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999," and Metropolitan Area Networks—Specific Requirements—Part 16: "Air Interface for Fixed Broadband Wireless Access Systems," May 2005 and related amendments/versions.

In some embodiments, receiver 100 may communicate in accordance with standards such as the Pan-European mobile system standard referred to as the Global System for Mobile Communications (GSM). Receiver 100 may also communicate in accordance with packet radio services such as the General Packet Radio Service (GPRS) packet data communication service. In some embodiments, receiver 100 may communicate in accordance with the Universal Mobile Telephone System (UMTS) for the next generation of GSM, which may, for example, implement communication techniques in accordance with 2.5G and 3G wireless standards (see 3GPP Technical Specification, Version 3.2.0, March 2000). In some of these embodiments, receiver 100 may provide packet data services (PDS) utilizing packet data protocols (PDP). In some embodiments, receiver 100 may communicate in accordance with other standards or other air-interfaces, including interfaces compatible with the enhanced data for GSM evolution (EDGE) standards (see 3GPP Technical Specification, Version 3.2.0, March 2000), although the scope of the invention is not limited in this respect.

In some embodiments, processing circuitry 126 may generate symbol-timing correction signal 127 and/or signal-detection indication signal 133 from correlation output 125 produced by the correlation circuitry 124. In these embodiments, receiver 100 may use symbol-timing correction signal 127 for time-synchronization and signal-detection indication signal 133 for initial signal detection for use in subsequent processing of data symbols.

In some OFDM embodiments, cyclic prefix removal circuitry 108 may remove a cyclic prefix from the input signal in response to symbol-timing correction signal 127, and the correlation performed by correlation circuitry 124 using reference signal 119 may comprise a cross-correlation to identify training symbols of a preamble within input samples 121. In these embodiments, Fourier-transform circuitry 110 may perform a Fourier transform after removal of the cyclic prefix, and frequency-domain channel estimator 130 may generate channel estimates from the subcarriers provided by Fourier-transform circuitry 110. Channel equalizer 112 may apply the channel estimates to the frequency-domain signals provided by Fourier-transform circuitry 110 to help cancel the effects of the channel.

In some of these embodiments, input samples 121 may comprise samples of an OFDM signal, and reference signal 119 comprises short and/or long training symbols in accordance with the IEEE 802.11(a) standard referenced above. In some embodiments, frequency-correction circuitry 106 may apply frequency-offset correction signal 129 to received signals, and correlation circuitry 124 may perform an auto-correlation with delayed versions of phase-quantized samples 123 to generate an auto-correlation output. Processing circuitry 126 may generate frequency-offset correction signal 129 from the auto-correlation output. In these embodiments, when phase correlator 120 performs an auto-correlation, a delayed version of the output of phase quantizer 122 may be used instead of reference signal 119, although the scope of the invention is not limited in this respect.

In some spread-spectrum embodiments, input samples 121 may comprise samples of a spread-spectrum CCK signal. In these spread-spectrum embodiments, reference signal 119 comprises preambles in accordance with the 802.11(b) standard referenced above, although the scope of the invention is not limited in this respect.

In some feature-recognition embodiments, reference signal 119 may comprise characteristics of a human voice, a human face or particular objects such as aircraft or missiles. In these embodiments, phase correlator 120 may be part of a feature recognition system, although the scope of the invention is not limited in this respect.

In some embodiments, RF circuitry 102, analog-to-digital conversion circuitry 104 and phase correlator 120 may be fabricated on a single radio-frequency integrated circuit (RFIC), although the scope of the invention is not limited in this respect. In some embodiments, most or all of the elements of receiver 100 illustrated in FIG. 1 may be fabricated on a single RFIC.

In some multiple-input multiple-output (MIMO) embodiments, receiver 100 may further include a plurality of receive-signal paths. Each receive-signal path may have RF circuitry 102 to receive signals from a corresponding one of a plurality of antennas. Each receive-signal path may also have ADC circuitry 104 and phase correlator 120. In these MIMO embodiments, each phase correlator 120 may generate a correlation output associated with signals received from the corresponding one of the antennas. In these embodiments, each phase correlator 120 may generate symbol-timing correction signals and processing circuitry 126 may apply the symbol-timing correction signals for signal detection or time-synchronization for processing data symbols within each receive-signal path, although the scope of the invention is not limited in this respect.

Antennas 101 may comprise one or more directional or omnidirectional antennas, including, for example, dipole antennas, monopole antennas, patch antennas, loop antennas, microstrip antennas, or other types of antennas suitable for reception of RF signals. In some MIMO embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of the antennas and a transmitting wireless communication device. In some embodiments, the antennas may be separated by up to $1/10$ of a wavelength or more, although the scope of the invention is not limited in this respect.

FIG. 2A graphically illustrates an example of phase quantization performed for some higher-resolution embodiments of the present invention. FIG. 2B graphically illustrates an example of phase quantization performed for some lower-resolution embodiments of the present invention. In some embodiments, the phase quantization illustrated in FIGS. 2A and 2B may be performed by a phase quantizer, such as phase quantizer 122 (FIG. 1). In these embodiments, output points 202 may correspond to phase-quantized samples 123 (FIG. 1). The circles illustrate samples with equal magnitude components. Different points on the circles illustrate different values for the phase components. In these embodiments, the output of phase quantizer 122 (FIG. 1) may correspond to one of output points 202. In these embodiments, input samples 121 (FIG. 1) may comprise one or more input samples, and phase quantizer 122 (FIG. 1) may replace each of the input samples with one of output points 202.

In some embodiments, phase quantizer 122 (FIG. 1) may locate an input sample at a point on complex plane 204 according to the real (Re) and the imaginary (Im) component of the input sample. Phase quantizer 122 (FIG. 1) may select one of output points 202 based on a line closest to the input sample that may be drawn from origin 206 through one of output points 202. For example, referring to FIG. 2A, output point 210 may be chosen when input sample 208 is located closer to line 212 than to line 214. In this example, output point 210 may correspond to a phase component having a predetermined value of '−2−j'. An output point may be similarly chosen in the lower resolution embodiments illustrated in FIG. 2B.

Figure 3:
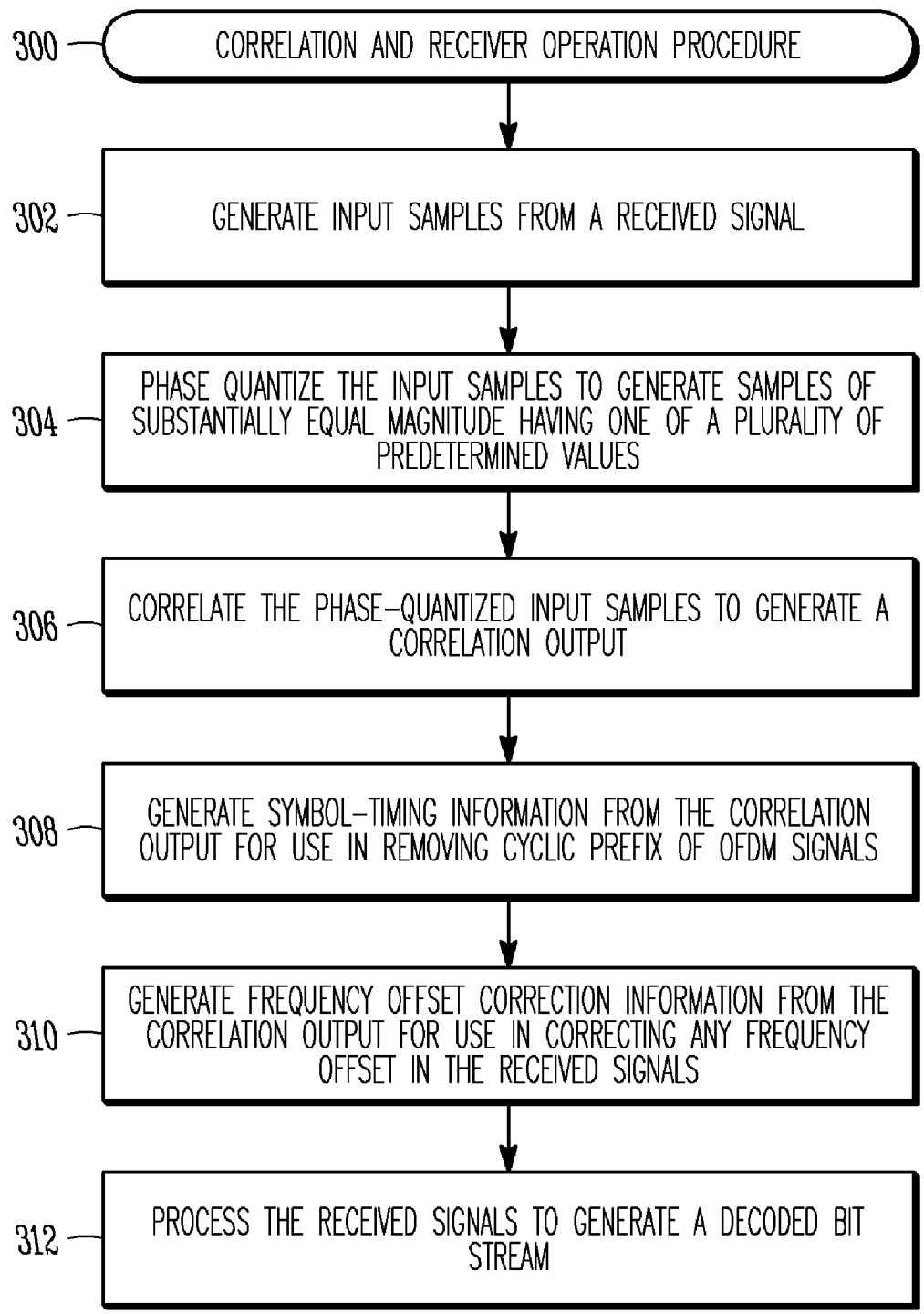
FIG. 3 is a flow chart of a correlation and receiver operation procedure in accordance with some embodiments of the present invention.

FIG. 3 is a flow chart of a correlation and receiver operation procedure in accordance with some embodiments of the present invention. Correlation and receiver operation procedure 300 may be performed by a receiver, such as receiver 100 (FIG. 1), although other receiver configurations may also be suitable. In some embodiments, procedure 300 may be performed on a frame-by-frame basis.

Operation 302 generates input samples from a received signal. Operation 302 may be performed by analog-to-digital conversion circuitry 104 (FIG. 1) to generate input samples 121 (FIG. 1).

Operation 304 phase quantizes the input samples to generate phase-quantized samples of substantially equal magnitude. The magnitude components of the phase-quantized samples may be substantially the same and the phase components may have one of a plurality of predetermined values. Examples of the predetermined values were discussed above for both higher and lower resolution embodiments. In some embodiments, operation 304 may be performed by phase quantizer 122 (FIG. 1).

Operation 306 correlates the phase-quantized input samples to generate a correlation output. In some embodiments, operation 306 may comprise performing an auto-correlation, while in other embodiments, operation 306 may comprise performing a cross-correlation. In some embodiments, operation 306 may be performed by correlation circuitry 124 (FIG. 1).

Operation 308 generates symbol-timing information from the correlation output generated in operation 306. In some embodiments, the symbol-timing information may be used to remove a cyclic prefix from OFDM symbols. In some embodiments, operation 308 may be performed by processing circuitry 126 (FIG. 1) for generating symbol-timing correction signal 127 (FIG. 1).

Operation 310 generates frequency-offset correction information from the correlation output generated in operation 306. In some embodiments, the frequency-offset correction information may be used to correct any frequency offset in the received signals. In some embodiments, operation 310 may be performed by processing circuitry 126 (FIG. 1) for generating frequency-offset correction signal 129 (FIG. 1).

Operation 312 processes the received signals to generate a decoded bit stream. In some embodiments, operation 312 may frequency-correct the received signals using the frequency-offset correction information generated in operation 310. Operation 312 may also remove a cyclic prefix using the symbol-timing information generated in operation 308 to generate a decoded bit stream. In some embodiments, operation 312 may be performed by frequency correction circuitry 106 (FIG. 1) and/or cyclic-prefix removal circuitry 108 (FIG. 1). In some embodiments, operation 312 may further process the received signals to generate the decoded bit stream, by performing a Fourier transform, a channel equalization, and/or a decoding operation.

Although the individual operations of procedure 300 are illustrated and described as separate operations, one or more of the individual operations may be performed concurrently, and nothing requires that the operations be performed in the order illustrated. For example, operations 308 and 310 may be performed concurrently.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the invention may be implemented in one or a combination of hardware, firmware and software. Embodiments of the invention may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a machine-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. An apparatus that performs a correlation using primarily phase components of input samples comprising:
    a phase quantizer to phase-quantize the input samples into phase-quantized samples having substantially equal magnitude components;
    correlation circuitry to correlate the phase-quantized samples with a reference signal;
    processing circuitry to generate a symbol-timing correction signal from a correlation output produced by the correlation circuitry; and
    cyclic prefix removal circuitry to remove a cyclic prefix from an-input signal in response to the symbol-timing correction signal.

2. The apparatus of claim 1 wherein the phase quantizer substantially removes magnitude information from the input samples and retains phase information from the input samples, and
    wherein the correlation circuitry performs a correlation using substantially the retained phase information of the phase-quantized samples.

3. The apparatus of claim 2 wherein the phase-quantized samples have one of a plurality of predetermined values and a magnitude component having approximately a predetermined value.

4. The apparatus of claim 3 wherein the phase-quantized samples have one of a plurality of eight predetermined values comprising 1+2j, 1−2j, −1+2j, −1−2j, 2+j, 2−j, −2+j, or −2−j, and
    wherein the predetermined value of the magnitude component comprises approximately the square-root of five.

5. The apparatus of claim 3 wherein the phase-quantized samples have one of a plurality of four predetermined values comprising 1+j, 1−j, −1+j, or −1−j, and
    wherein the predetermined value of the magnitude component comprises approximately the square-root of two.

6. An apparatus that performs a correlation using primarily phase components of input samples comprising:
    a phase quantizer to phase-quantize the input samples into phase-quantized samples having substantially equal magnitude components;
    correlation circuitry to correlate the phase-quantized samples with a reference signal; and
    processing circuitry to generate a symbol-timing correction signal and a signal-detection indication signal from a correlation output produced by the correlation circuitry,
    wherein the apparatus is part of a receiver that uses the symbol-timing correction signal for time-synchronization and the signal-detection indication signal for initial signal detection.

7. The apparatus of claim 6 further comprising cyclic prefix removal circuitry to remove a cyclic prefix from an input signal in response to the symbol-timing correction signal,
    wherein the correlation performed by the correlation circuitry using the reference signal comprises either a cross-correlation to identify training symbols of a preamble within the input samples, or an auto-correlation with a delayed version of the phase-quantized samples.

8. The apparatus of claim 7 further comprising:
    Fourier-transform circuitry to perform a Fourier transform after removal of the cyclic prefix;
    a frequency-domain channel estimator to generate channel estimates from subcarriers provided by the Fourier-transform circuitry; and
    a channel equalizer to apply the channel estimates to frequency-domain signals provided by the Fourier-transform circuitry to, at least in part, cancel effects of a communication channel.

9. The apparatus of claim 7 wherein the input samples comprise samples of an orthogonal frequency division multiplexed (OFDM) signal, and
    wherein the reference signal comprises known training symbols.

10. The apparatus of claim 6 further comprising frequency-correction circuitry to apply a frequency-offset correction signal to received signals,
    wherein the correlation circuitry further performs an auto-correlation with delayed versions of the phase-quantized samples to generate an auto-correlation output, and
    wherein the processing circuitry further generates the frequency-offset correction signal, the symbol-timing correction signal and the signal-detection indication signal from the auto-correlation output.

11. The apparatus of claim 1 wherein the input samples comprise samples of a spread-spectrum complementary code keying (CCK) signal, and
    wherein the reference signal comprises either preambles with known training information therein for use in performing a cross-correlation, or a delayed version of the phase-quantized input samples for use in performing an auto-correlation.

12. The apparatus of claim 6 further comprising:
    radio-frequency (RF) circuitry to down-convert received RF signals; and
    analog-to-digital conversion circuitry to generate input samples for use by the phase quantizer, wherein at least the RF circuitry, the analog-to-digital conversion circuitry, the phase quantizer, and the correlation circuitry are fabricated on a single radio-frequency integrated circuit (RFIC).

13. The apparatus of claim 6 further comprising a plurality of receive-signal paths, each receive-signal path having radio-frequency (RF) circuitry to receive signals from a corresponding one of a plurality of antennas, analog-to-digital conversion (ADC) circuitry, and a phase correlator,
wherein each phase correlator generates a correlation output associated with signals received from the corresponding one of the antennas,
wherein each phase correlator comprises:
a phase quantizer to phase-quantize an input samples into phase-quantized samples; and
correlation circuitry to correlate the phase-quantized samples with a reference signal,
wherein the processing circuitry generates symbol-timing correction signals from the correlation outputs, and
wherein the processing circuitry applies the symbol-timing correction signals for one or more of signal detection or time-synchronization for processing data symbols within each receive-signal path.

14. A method performed by a receiver for processing received signals comprising performing a correlation using primarily phase components of input samples,
wherein the correlation comprises:
phase quantizing the input samples into phase-quantized samples having substantially equal magnitude components;
correlating the phase-quantized samples with a reference signal to produce a correlation output;
generating a symbol-timing correction signal from the correlation output; and
removing a cyclic prefix from an-input signal in response to the symbol-timing correction signal.

15. The method of claim 14 wherein phase quantizing comprises substantially removing magnitude information from the input samples and retaining phase information from the input samples,
wherein correlating comprises performing a correlation using substantially the retained phase information of the phase-quantized samples, and
wherein the phase-quantized samples have one of a plurality of predetermined values and a magnitude component having approximately a predetermined value.

16. The method of claim 15 wherein the phase-quantized samples have one of a plurality of eight predetermined values comprising 1+2j, 1−2j, −1+2j, −1−2j, 2+j, 2−j, −2+j, or −2−j, and
wherein the predetermined value of the magnitude component comprises approximately the square-root of five.

17. The method of claim 15 wherein the phase-quantized samples have one of a plurality of four predetermined values comprising 1+j, 1−j, −1+j, or −1−j, and
wherein the predetermined value of the magnitude component comprises approximately the square-root of two.

18. A method performed by a receiver to process received signals by performing a correlation using primarily phase components of input samples, wherein the correlation comprises:
phase quantizing the input samples into phase-quantized samples having substantially equal magnitude components;
correlating the phase-quantized samples with a reference signal;
generating a symbol-timing correction signal and a signal-detection indication signal from a correlation output produced by correlating; and
using the symbol-timing correction signal for time-synchronization and the signal-detection indication signal for initial signal detection.

19. The method of claim 18 further comprising removing a cyclic prefix from the input signal in response to the symbol-timing correction signal,
wherein correlating comprises either cross-correlating with the reference signal to identify training symbols of a preamble within the input samples, or auto-correlating with a delayed version of the phase-quantized samples.

20. The method of claim 19 further comprising:
performing a Fourier transform after removing the cyclic prefix;
generating channel estimates from subcarriers provided by the Fourier-transform; and
applying the channel estimates to frequency-domain signals provided by the Fourier-transform to cancel effects of a communication channel.

21. The method of claim 19 wherein the input samples comprise samples of an orthogonal frequency division multiplexed (OFDM) signal, and
wherein the reference signal comprises known training symbols.

22. The method of claim 18 further comprising applying a frequency-offset correction signal to received signals,
wherein the correlating comprises performing an auto-correlation with delayed versions of the phase-quantized samples to generate an auto-correlation output, and
wherein the method further comprises generating the frequency-offset correction signal, the symbol-timing correction signal, and the signal-detection indication signal from the auto-correlation output.

23. The method of claim 14 wherein the input samples comprise samples of a spread-spectrum complementary code keying (CCK) signal, and
wherein the reference signal comprises either preambles with known training information therein for use in performing a cross-correlation or a delayed version of the phase-quantized input samples for use in performing an auto-correlation.

24. A receiver system comprising:
one or more substantially omnidirectional antennas; and
a phase correlator to perform a correlation using primarily phase components of input samples received through the antennas, the phase correlator comprising:
a phase quantizer to phase-quantize the input samples into phase-quantized samples having substantially equal magnitude components; and
correlation circuitry to correlate the phase-quantized samples with a reference signal,
wherein the receiver system further comprises:
processing circuitry to generate a symbol-timing correction signal from a correlation output produced by the correlation circuitry; and
cyclic prefix removal circuitry to remove a cyclic prefix from an-input signal in response to the symbol-timing correction signal.

25. The receiver system of claim 24 wherein the phase quantizer substantially removes magnitude information from the input samples and retains phase information from the input samples, and
wherein the correlation circuitry performs a correlation using substantially the retained phase information of the phase-quantized samples.

26. A receiver system comprising:

one or more substantially omnidirectional antennas; and a phase correlator to perform a correlation using primarily phase components of input samples received through the antennas, the phase correlator comprising:

a phase quantizer to phase-quantize the input samples into phase-quantized samples having substantially equal magnitude components; and correlation circuitry to correlate the phase-quantized samples with a reference signal, wherein the phase quantizer substantially removes magnitude information from the input samples and retains phase information from the input samples, wherein the correlation circuitry performs a correlation using substantially the retained phase information of the phase-quantized samples, wherein the phase-quantized samples have one of a plurality of predetermined values and a magnitude component having approximately a predetermined value, wherein the receiver system further comprises processing circuitry to generate a symbol-timing correction signal and a signal-detection indication signal from a correlation output produced by the correlation circuitry, and wherein the receiver system uses the symbol-timing correction signal for time-synchronization and the signal-detection indication signal for initial signal detection.

27. A computer-readable storage medium that stores instructions for execution by one or more processors to perform operations to perform a correlation using primarily phase components of input samples, the correlation comprising a phase quantization of the input samples into phase-quantized samples and a correlation of the phase-quantized samples having substantially equal magnitude components with a reference signal, wherein the operations further configure the one or more processors to generate a symbol-timing correction signal from a correlation output produced by the correlation circuitry and to remove a cyclic prefix from an-input signal in response to the symbol-timing correction signal.

28. The computer-readable storage medium of claim 27 wherein the operations further configure the one or more processors to substantially remove magnitude information from the input samples and retain phase information from the input samples, and wherein correlation comprises a correlation using substantially the retained phase information of the phase-quantized samples.

29. The computer-readable storage medium of claim 28 wherein the phase-quantized samples have one of a plurality of predetermined values and a magnitude component having approximately a predetermined value.

* * * * *